(12) United States Patent
Furuta

(10) Patent No.: US 12,533,924 B2
(45) Date of Patent: Jan. 27, 2026

(54) VEHICLE CONTROL DEVICE

(71) Applicant: TOYOTA JIDOSHA KABUSHIKI KAISHA, Toyota (JP)

(72) Inventor: Hiroki Furuta, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 24 days.

(21) Appl. No.: 18/600,913

(22) Filed: Mar. 11, 2024

(65) Prior Publication Data

US 2024/0351389 A1 Oct. 24, 2024

(30) Foreign Application Priority Data

Apr. 24, 2023 (JP) ................................. 2023-070649

(51) Int. Cl.
*B60G 17/018* (2006.01)

(52) U.S. Cl.
CPC .... *B60G 17/0182* (2013.01); *B60G 2400/204* (2013.01)

(58) Field of Classification Search
CPC .......... B60G 17/0182; B60G 2400/204; B60G 2400/252; B60G 17/0157; B60G 17/016

USPC ........................................................ 701/37
See application file for complete search history.

(56) References Cited

U.S. PATENT DOCUMENTS

2006/0261647 A1* 11/2006 Maas ..................... B60N 2/522
297/216.1

FOREIGN PATENT DOCUMENTS

JP 2006-509673 A 3/2006

* cited by examiner

*Primary Examiner* — Maceeh Anwari
(74) *Attorney, Agent, or Firm* — SoraIP, Inc.

(57) ABSTRACT

The present disclosure includes an active suspension having an actuator disposed between a carrier member and a vehicle body, a state detection device that detects state information that is information about a current or future acceleration applied to the carrier member, a controller that supplies a control current to the actuator such that, when the up-down direction position of the carrier member is not a preset zero point, the up-down direction position of the carrier member becomes a zero point, and a traveling detection device that detects traveling information that is information about travel of the vehicle, and the controller executes a zero point change processing of changing the zero point based on the traveling information and the state information.

13 Claims, 3 Drawing Sheets

VEHICLE CONTROL DEVICE

CROSS-REFERENCE TO RELATED APPLICATION

This application claims priority to Japanese Patent Application No. 2023-070649 filed on Apr. 24, 2023, incorporated herein by reference in its entirety.

BACKGROUND

1. Technical Field

The disclosure relates to a vehicle control device.

2. Description of Related Art

An active suspension may be disposed between a seat and a vehicle body to suppress vibration of the seat of a vehicle. The active suspension is configured to be capable of controlling forces acting between the seat and the vehicle body. A controller controls the active suspension so that vibration of the seat is suppressed in response to the input of the vibration to the seat. For example, Japanese Unexamined Patent Application Publication (Translation of PCT Application) No. 2006-509673 (JP 2006-509673 A) describes an active suspension provided to a seat and having two degrees of freedom of movement.

SUMMARY

In a controller for controlling an active suspension including an actuator, a zero point (reference point) is set with respect to a height (up-down direction position) of a seat. The controller supplies a control current to the actuator to control the height of the seat, so that the position of the seat is maintained at the zero point when the seat moves up and down due to vibration. In such a configuration, when the zero point is set in a state in which there is no occupant on the seat, the control current continues to be supplied to the actuator with respect to downward movement of the seat due to mass of the occupant while the occupant is seated on the seat. Such a configuration has room for improvement from a perspective of energy conservation.

An object of the disclosure is to provide a vehicle control device that is capable of suppressing unnecessary energy consumption with respect to control of an active suspension.

A vehicle control device according to the disclosure includes a carrier member, an active suspension, a state detection device, a controller, and a traveling detection device. The carrier member is installed in a vehicle so as to be movable relative to a vehicle body, on which an occupant or an object to be conveyed is placed. The active suspension is a device disposed between the carrier member and the vehicle body. The active suspension includes an actuator for changing a relative position of the carrier member in an up-down direction with respect to the vehicle body. The state detection device detects state information that is information regarding current or future acceleration applied to the carrier member. The controller controls the active suspension based on the state information. The controller supplies a control current to the actuator such that an up-down direction position of the carrier member transitions to a zero point that is set in advance when the up-down direction position of the carrier member is not at the zero point. The traveling detection device detects traveling information that is information regarding traveling of the vehicle. The controller executes zero point changing processing of changing the zero point, based on the traveling information and the state information.

According to the disclosure, the zero point with respect to the carrier member is appropriately changed at an appropriate timing, based on the traveling information (e.g., whether traveling) and the state information (e.g., whether there is any vibration). That is to say, according to the disclosure, even when the situation upon the carrier member changes, the zero point is updated in accordance with the situation. Thus, unnecessary energy consumption can be suppressed with respect to control of the active suspension.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a vehicle control device 1 according to an embodiment of the present disclosure will be described in detail with reference to the drawings as an embodiment for carrying out the present disclosure. Besides the following embodiments, the disclosure can be carried out in various forms in which various modifications and improvements are made based on the knowledge of those skilled in the art. The vehicle of the present embodiment, the wheels 8 are disposed respectively on the front and rear left and right.

Figure 1:
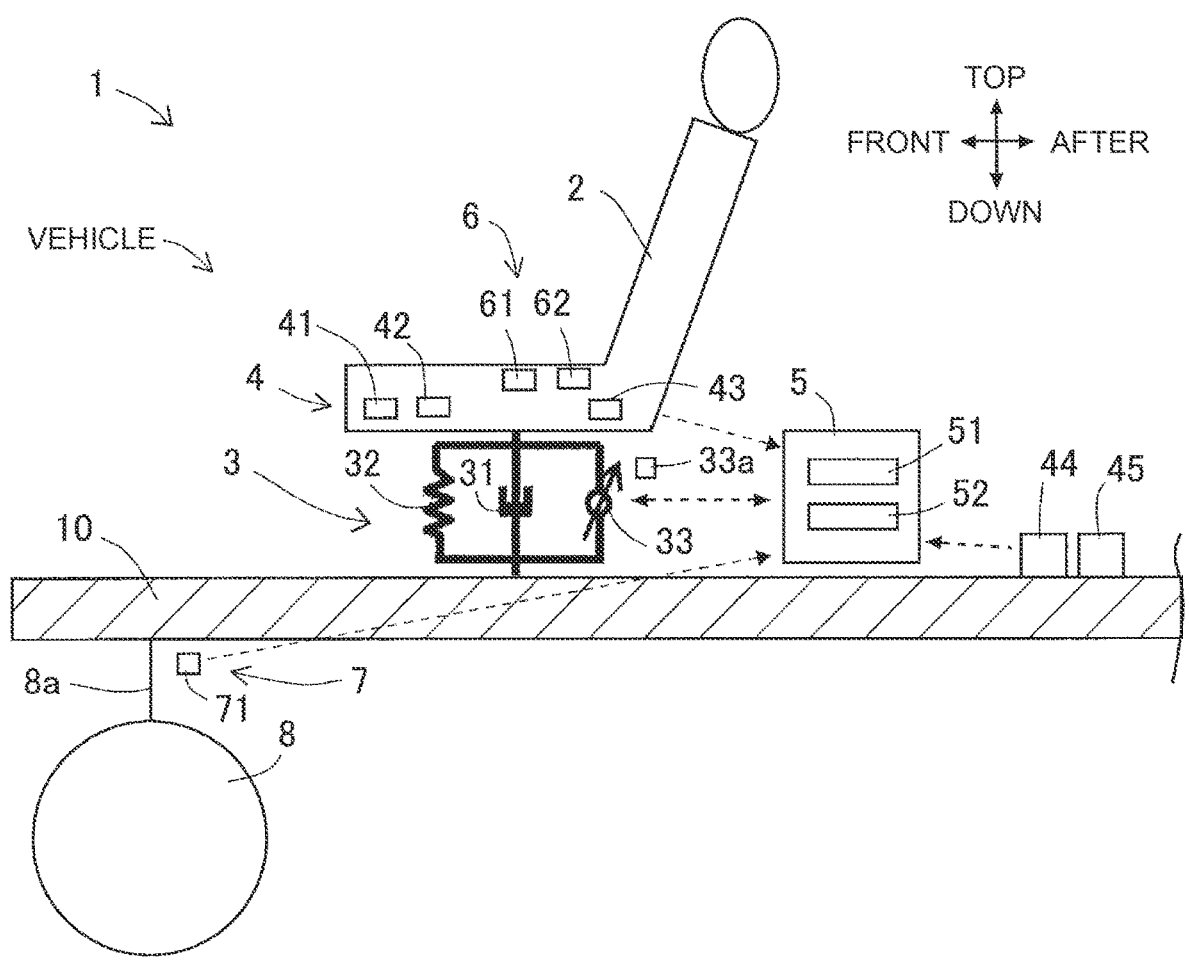
FIG. 1 is a configuration diagram of a vehicle control device according to the present embodiment.

As illustrated in FIG. 1, the vehicle control device 1 includes a seat 2 as a carrier member, an active suspension 3, a state detection device 4, a controller 5, a presence detection device 6, and a traveling detection device 7. The carrier member is installed in the vehicle so as to be movable relative to the vehicle body 10, and is a member on which an occupant or an object to be conveyed is placed. In the present embodiment, the carrier member is the seat 2 as a member for the occupant to sit or lie down. In addition to the seat 2, the carrier member may be, for example, a bed in which an occupant is laid in a vehicle (for example, an ambulance), a stretcher frame in which a stretcher is fixed in the vehicle, a pedestal for placing a precision machine (object to be conveyed), or a floor member.

The active suspension 3 is disposed between the seat 2 and the vehicle body 10. The active suspension 3 is installed, for example, on a bottom surface forming member of the vehicle body 10. The active suspension 3 includes an actuator 33 that changes a relative position of the seat 2 with respect to the vehicle body 10 in the vertical direction. The active suspension 3 of the present embodiment includes a plurality of actuators 33. The plurality of actuators 33 can change a seat posture (carrier posture) which is a relative posture of the seat 2 with respect to the vehicle body 10. The active suspension 3 is configured to be able to control a force acting between the seat 2 and the vehicle body 10. The active suspension 3 may be configured to be capable of controlling the damping force between the vehicle body 10 and the seat 2 and/or the spring constant (elastic force) between the vehicle body 10 and the seat 2 in addition to the control of the seat attitude and the position. The seat 2 connected to the active suspension 3 is also referred to as an active seat.

Conceptually describing an example of the active suspension 3, the active suspension 3 includes a shock absorber 31 as a damper element, a suspension spring 32 as a spring element, and a plurality of actuators 33. The plurality of actuators 33 are configured to be capable of changing the relative position of the seat 2 in the vertical direction with respect to the vehicle body 10, the relative posture in the roll direction, and the relative posture in the pitch direction.

In the present embodiment, at least three actuators 33 are spaced apart from one seat 2, that is, from one active suspension 3. For example, three actuators 33 arranged in parallel spaced apart from each other with respect to one seat 2 can move the seat 2 in the up-down direction (heave direction), and can change the seat posture in the roll direction and/or the pitch direction. According to the three actuators 33, the seat 2 can be tilted and can correspond to the swing in the roll direction or the swing in the pitch direction. Each actuator 33 includes an electric motor serving as a drive source and a speed reduction mechanism. The drive source of the actuator 33 may be, for example, a hydraulic drive source.

The shock absorber 31 generates a damping force between the vehicle body 10 and the seat 2. The shock absorber 31 may be of a variable type in which the damping force (which may be a damping coefficient or a damping ratio) can be changed, or may be of a non-variable type in which the damping force cannot be changed. The suspension spring 32 generates an elastic force between the vehicle body 10 and the seat 2 according to the spring constant. The suspension spring 32 may be a spring constant variable or a spring constant non-variable.

The state detection device 4 is a device that detects state information that is information related to the present or future acceleration occurring in the seat 2. The state information, i.e., the state of the seat 2, can be expressed, for example, by an acceleration, a speed, or a displacement amount. If the displacement amount in at least three positions of the seat 2 can be calculated, the posture of the seat 2 can be grasped.

The state detection device 4 of the present embodiment includes three acceleration sensors 41, 42, and 43 that detect acceleration in the vertical direction. Each of the three acceleration sensors 41 to 43 is disposed on the seat 2 at a distance from each other. For example, the acceleration sensor 41 is installed in a right front portion of the bottom surface of the seat 2, the acceleration sensor 42 is installed in a left front portion of the bottom surface of the seat 2, and the acceleration sensor 43 is installed in a right rear portion or a left rear portion of the bottom surface of the seat 2.

At least three acceleration sensors 41 to 43 are installed on the seat 2, and the seat 2 is regarded as a rigid body, so that the state quantity (for example, displacement amount or posture) of an arbitrary plane of the seat 2 can be calculated. The first-order time integral value of the acceleration is a velocity, and the second-order time integral value of the acceleration is a displacement amount. As described above, the state detection device 4 of the present embodiment detects information (acceleration, speed, or displacement amount) related to the current acceleration occurring at the three positions of the seat 2.

The controller 5 comprises an electronic control unit (ECU) comprising one or more processors 51 and one or more memories 52. The memory 52 is communicatively coupled to the processor 51. The memory 52 may be an internal memory or an external memory. The controller 5 is communicably connected to the active suspension 3, the state detection device 4, the presence detection device 6, and the traveling detection device 7.

The controller 5 controls the active suspension 3 corresponding to the seat 2 detected by the occupant, for example, when the seating sensor 61 as the presence detection device 6 that determines whether the occupant is seated on the seat 2 detects the occupant. The controller 5 does not control the active suspension 3 corresponding to the seat 2 on which the occupant is not seated. The seating sensor 61 is, for example, a load sensor or a capacitive sensor.

The controller 5 controls the active suspension 3 based on the detection result of the state detection device 4, that is, the state information. The controller 5 changes the seat posture in at least one of the roll direction and the pitch direction based on the state information. The controller 5 can also move the seat 2 in the up-down direction. The controller 5 controls the active suspension 3 so as to reduce the vibration of the seat 2 and the attitude variation of the occupant. In the vibration damping control, for example, the seat attitude is controlled so as to reduce the acceleration applied to the occupant in the front, rear, left, and right directions due to the inclination of the vehicle. The controller 5 executes the damping control considering the effect on the vehicle body 10 due to the foot suspension 8a provided in the respective wheels 8.

The controller 5 controls the three actuators 33 to control the position of the seat 2 in the vertical direction, the attitude in the roll direction, and the attitude in the pitch direction. The controller 5 sets a current value of a control current to be supplied to each actuator 33. The controller 5 supplies a control current to the electric motor of each actuator 33 via a corresponding drive circuit (not shown). The current value of the control current correlates with the amount of expansion and contraction of the actuator 33. The amount of expansion and contraction of the actuator 33, that is, the amount of displacement of the corresponding portion of the seat 2 caused by the operation of the actuator 33, can also be referred to as the amount of control of the actuator 33. For example, the controller 5 performs feedback control such that each detection value approaches the target value based on the detection values of the acceleration sensors 41 to 43 as the vibration damping control.

The presence detection device 6 is a device that detects presence information that is information about the presence of an occupant or an object to be conveyed on the seat 2. The presence detection device 6 of the present embodiment is a seating sensor 61, and is provided in the seat 2. For example, in the case of a load sensor, the seating sensor 61 detects a change in the load applied to the seat 2, and in the case of a capacitive sensor, detects a change in the capacitance. The seating sensor 61 transmits presence information, which is a detection result, to the controller 5. The controller 5 determines the presence or absence of an occupant or an object to be conveyed on the seat 2 based on the presence information.

The traveling detection device 7 is a device that detects traveling information that is information related to travel of the vehicle. The traveling detection device 7 is, for example, a wheel speed sensor 71 provided in each wheel 8. Each wheel speed sensor 71 detects the wheel speed of the corresponding wheel 8 and transmits it to the controller 5. The controller 5 can calculate the vehicle speed based on the detection result received from each wheel speed sensor 71. That is, the controller 5 can recognize the traveling state of the vehicle based on the detection result of each wheel speed sensor 71. The traveling detection device 7 may be, for example, position information of the host vehicle or a navigation system using the position information. Further, the traveling detection device 7 may be an ECU that calculates the vehicle speed. ECU calculates the vehicle speed on the basis of, for example, the detection result received from the wheel speed sensors 71 or the position information of the host vehicle. The controller 5 receives the calculation result (vehicle speed information) from ECU.

Zero Point Change Processing

In the controller 5, a zero point is set in advance with respect to the up-down direction position (up-down direction position: height) of the seat 2. The zero point is a reference point for controlling the actuator 33. When the up-down direction position of the seat 2 is the zero point, the controller 5 does not control the vertical direction of the seat 2. That is, the controller 5 does not supply a control current for changing the up-down direction position of the seat 2 to the actuator 33.

On the other hand, when the up-down direction position of the seat 2 is not the zero point, the controller 5 supplies a control current to each actuator 33 so that the up-down direction position of the seat 2 becomes the zero point. The zero point of the initial setting is set to, for example, the up-down direction position of the seat 2 in a state where there is no occupant on the seat 2 and in a state where the seat 2 is not vibrated. When the occupant is seated on the seat 2 in a state in which the zero point is set with respect to the up-down direction position at the time of "no occupant", the controller 5 supplies the control current in response to the movement of the seat 2 downward from the zero point due to the mass of the occupant even in a state in which there is no vibration. In a state in which no vibration is applied to the seat 2, a control current is supplied to the actuator 33, which leads to a loss of energy.

Therefore, the controller 5 of the present embodiment executes the zero point change processing for changing the zero point based on the traveling information and the state information. The controller 5 determines whether or not the state of the vehicle is a stop state based on the traveling information that is the detection result of the traveling detection device 7. The controller 5 determines the vibration state of the seat 2 based on the state information that is the detection result of the state detection device 4. Further, the controller 5 determines the presence or absence of an occupant or an object to be conveyed (hereinafter, referred to as "occupant or the like") on the seat 2 based on the presence information that is the detection result of the presence detection device 6.

For example, when the vehicle is at a stop, the controller 5 can estimate that the seat 2 is stable (not vibrating), and therefore executes the zero point change processing. As the zero point change processing, the controller 5 first stops the supply of the control current to each actuator 33 (control current=0).

Subsequently, in a state in which the supply of the control current is stopped, the controller 5 sets the up-down direction position of the seat 2 after a predetermined time has elapsed from the stop of the supply of the control current to the zero point. The predetermined time is set to, for example, a value equal to or more than a time (estimated time) required from when the control current becomes 0 until when the seat 2 stabilizes. Alternatively, the controller 5 sets the up-down direction position of the seat 2 to the zero point when the vibration level of the seat 2 is equal to or lower than a predetermined permission threshold value in a state where the supply of the control current is stopped. The vibration level is, for example, a state quantity (acceleration, speed, or displacement) in the up-down direction, the roll direction, and the pitch direction.

When an occupant or the like is present in the seat 2 at the time of executing the zero point change processing, the set zero point becomes a zero point (zero point at the time of presence) at the time of presence of the occupant or the like. When there is no occupant or the like in the seat 2 at the time of executing the zero point change processing, the set zero point becomes a zero point (zero point at the time of absence) at the time of absence of the occupant or the like. After setting (changing or updating) the zero point, the controller 5 resumes the control of the active suspension 3.

Execution Condition

A specific example of the execution condition of the zero point change processing will be described. Based on the traveling information, the controller 5 determines whether or not the vehicle speed, which is the speed of the vehicle, is equal to or less than a predetermined speed threshold. The controller 5 executes zero point change processing when (1) the vehicle speed is equal to or lower than the speed threshold value, or (2) the vehicle speed is higher than the speed threshold value but the vibration level of the seat 2 is equal to or lower than the predetermined vibration threshold value. When one of the execution conditions (1) and (2) is satisfied, the controller 5 executes zero point change processing.

When the vehicle speed calculated based on the detection result of each wheel speed sensor 71 is equal to or lower than the predetermined speed ($0 \leq$ vehicle speed $\leq$ predetermined speed), the controller 5 determines that the state of the vehicle is the stop state. The predetermined speed is a small value (e.g., 5 km/h), and in this processing, traveling at an extremely low speed is treated as a stop condition. The predetermined speed may be set to 0.

When it is determined that the state of the vehicle is in the stop state, the controller 5 can estimate that the seat 2 is not vibrating, and thus executes the zero point change processing. On the other hand, when the vehicle speed is higher than the speed threshold, that is, when it is determined that the state of the vehicle is the traveling state, the controller 5 determines whether or not the vibration level of the seat 2 is equal to or lower than a predetermined vibration threshold based on the state information. When the state quantity in each direction is equal to or less than the corresponding vibration threshold value even when the vehicle is traveling, the controller 5 determines that the seat 2 is not vibrating and executes the zero point change processing. When the detection value of each of the acceleration sensors 41 to 43 is equal to or less than the threshold value, the controller 5 may determine that the seat 2 is not vibrating. Further, the determination of the presence or absence of vibration by comparing the vibration level with the vibration threshold may be performed even when the state of the vehicle is in the stopped state. The vibration threshold value may be the same as or different from the permission threshold value.

The vehicle body 10 or the seat 2 of the present embodiment is provided with a lateral acceleration sensor 44 for detecting lateral acceleration and a longitudinal acceleration sensor 45 for detecting longitudinal acceleration (hereinafter, sometimes abbreviated as "acceleration sensors 44 and 45"). The controller 5 may register "the detected values of the acceleration sensors 44 and 45 are equal to or less than a corresponding predetermined threshold value" as the execution condition of the zero point change processing during the vehicle running. That is, the controller 5 executes the zero point change processing when the vibration level of the seat 2 is equal to or lower than the vibration threshold value and the detection value of each of the acceleration sensors 44 and 45 is equal to or lower than the corresponding threshold value even when the vehicle is traveling. As described above, the controller 5 determines that the zero point is adjustable when there is no or small vibration in each direction of the seat 2 even when the vehicle is traveling. That is, the controller 5 determines whether or not the state of the seat 2 is in a state in which the zero point change processing can be executed based on the state information and the execution condition. The controller 5 may acquire information on the lateral acceleration and/or the longitudinal acceleration of the vehicle body 10 or the seat 2 as the state information.

In place of the detection value of the lateral acceleration sensor 44, the controller 5 may use, for example, an operation amount (operation angle) of an operation member (for example, a steering wheel) of the turning angle as a determination element. In addition, the controller 5 may use, for example, an accelerator operation amount (accelerator opening degree) and a brake operation amount as determination elements in place of the detection value of the longitudinal acceleration sensor 45. Each manipulated variable is detected by, for example, a corresponding manipulated variable sensor.

Further, the controller 5 may use the detection result of the seat belt sensor 62 that detects that the seat belt is mounted on the seat 2 in place of or in addition to the detection result of the seating sensor 61 as an element for determining the presence or absence of an occupant or the like. When it is detected that the seat belt is attached, the controller 5 may determine that the occupant is seated (present) on the seat 2 instead of the object to be conveyed.

The execution conditions can also be described as follows. The controller 5 determines whether or not the state of the vehicle is a stop state based on the traveling information. The controller 5 executes zero point change processing when (1) the state of the vehicle is in a stop state, or (2) the state of the vehicle is in a traveling state but the vibration level of the seat 2 is equal to or lower than a predetermined vibration threshold value.

Mass Calculation Processing

When the controller 5 determines that there is an occupant or the like on the seat 2 based on the presence data, and when executing the zero point change processing, the controller 5 executes the mass calculation processing of calculating the mass of the occupant or the like. That is, the controller 5 also executes the mass calculation processing when executing the zero point change processing of setting the zero point when present.

The actuators 33 are provided with a displacement sensor 33a that detects the amount of expansion and contraction of the actuator 33 as a state sensor that detects the state of the actuator 33. The controller 5 stores the detected value of the displacement sensor 33a in a state in which no occupant or the like is present in the seat 2, that is, in a state in which the actuators 33 are not controlled, as a reference value for the mass calculation processing. The controller 5 may store the amount of expansion and contraction of each actuator 33 corresponding to the absent zero point as a reference value of the mass calculation processing.

When the present zero point is set, the controller 5 calculates the stroke (the amount of change in expansion and contraction) of the respective actuators 33 due to the presence of the occupant or the like based on the difference between the detected value of the displacement sensor 33a and the reference value (hereinafter referred to as the seating displacement difference). The controller 5 calculates the mass of the occupant or the like based on the stroke. The controller 5 may store a mass map that is a database indicating the relationship between the seating displacement difference and the mass of the occupant or the like. In this case, the controller 5 calculates the mass of the occupant or the like based on the seating displacement difference and the mass map. The state sensor may vary depending on the configuration of the active suspension 3. For example, when the active suspension 3 having a configuration in which the angle of the actuator 33 changes in accordance with the amount of expansion and contraction is installed, the status sensor may be an angle sensor that detects the angle of the actuator 33 instead of the displacement sensor 33a. The stroke can be calculated based on the angle of the actuator 33. Further, the mass calculation processing may be executed only when an occupant is present on the seat 2 instead of the conveyance target.

Control Flow

Figure 2:
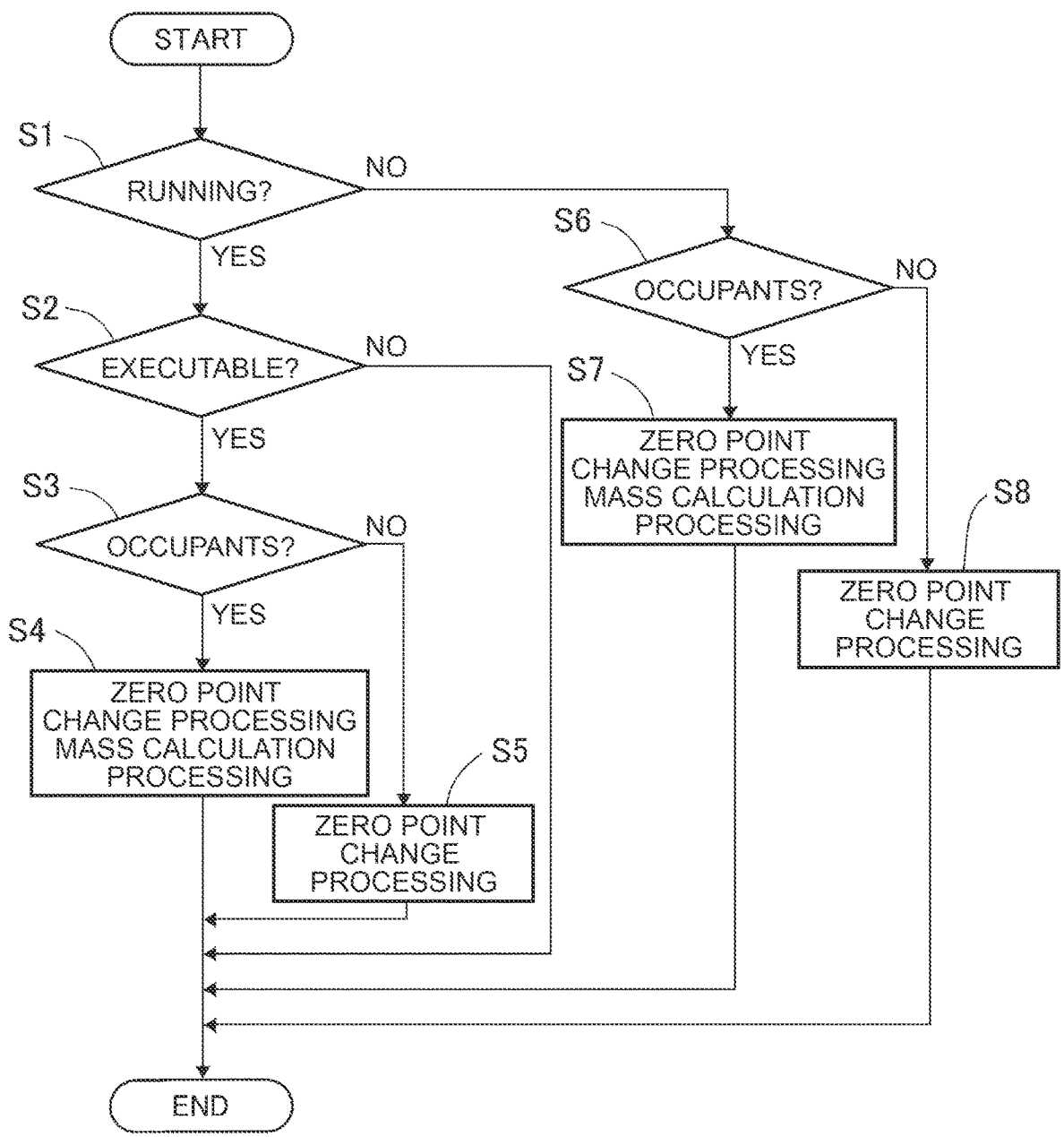
FIG. 2 is a flow chart illustrating an exemplary control of the present embodiment.

Exemplary control of the present embodiment will be described. In this example, the presence detection device 6 detects, as the presence information, information regarding the presence or absence of the occupant, rather than the object to be conveyed. Further, the active suspension 3 of the passenger seat (seat 2) is controlled as an example. As illustrated in FIG. 2, the controller 5 determines whether or not the vehicles are traveling based on the traveling information (S1). When the vehicle is traveling (S1), the controller 5 determines whether or not the state of the seat 2 is in a state where the zero point change processing can be executed based on the state information and the execution condition (S2). When the state of the seat 2 is a state in which the zero point change processing can be executed (S2: Yes), the controller 5 determines the presence or absence of the occupant of the seat 2 based on the presence data (S3). When the occupant is seated on the seat 2 (S3: Yes), the controller 5 executes a zero point change processing and a mass calculation processing on the seat 2 (S4). On the other hand, when the occupant is not seated on the seat 2 (S3: No), the controller 5 executes a zero point change processing on the seat 2 (S5). When the state of the seat 2 is not in a state in which the zero point change processing can be executed (S2: No), the controller 5 ends the control related to the zero point change processing.

When the vehicle is at a stop (S1: No), the controller 5 determines whether or not the occupant is seated on the seat 2 (S6). When the occupant is seated on the seat 2 (S6: Yes), the controller 5 executes a zero point change processing and a mass calculation processing on the seat 2 (S7). When the occupant is not seated on the seat 2 (S6: No), the controller 5 executes a zero point change processing on the seat 2 (S8).

The controller 5 repeatedly performs such control on each seat 2 provided with the active suspension 3 at predetermined time intervals. Further, the execution order of the state determination based on the state information, the presence determination based on the presence information, and the travel determination based on the traveling information is not limited to the above, and can be changed as appropriate. Further, for example, the zero point change processing of the zero point in absence may be performed only when the vehicle is at a stop. Further, the controller 5 may determine whether or not the state of the seat 2 is in a state in which the zero point change processing can be executed even when the vehicle is stopped.

According to the present embodiment, the zero point for the seat 2 is appropriately changed at an appropriate timing based on the traveling information (presence or absence of travel) and the state information (presence or absence of vibration). That is, according to the present embodiment, even when the situation on the seat 2 changes, the zero point is updated according to the situation. Thus, unnecessary energy consumption can be suppressed with respect to the control of the active suspension 3.

The controller 5 also performs a mass calculation processing when setting a zero point in the presence. As a result, it is possible to perform control in consideration of the mass of the occupant on the seat 2, and it is possible to improve the accuracy of the damping control of the active suspension 3. The degree of influence due to the magnitude of the mass of the occupant on the seat 2 is small for the control of the foot suspension 8a because the mass of the vehicle body 10 is large, but is not small for the control of the active suspension 3 of the seat 2 that is considerably lighter than the vehicle body 10. Therefore, the control accuracy can be improved by calculating the mass of the occupant on the seat 2 and reflecting the calculated value in the calculation of the control. According to the present embodiment, since the zero point change processing and the mass calculation processing are executed under the same execution condition, various processes are efficiently executed for the active suspension 3.

Other

The present disclosure is not limited to the above embodiment. For example, the state detection device 4 may be configured to include a device that detects information (road surface information) on a road surface to be traveled, which is a road surface on which the target wheel is to travel. The road surface information includes, for example, a vertical displacement of the road surface, a speed (time differential value of the displacement), and/or an acceleration (time differential value of the speed). That is, the road surface information is information related to the vertical displacement of the road surface to be traveled. The target wheels can be set as appropriate.

Figure 3:
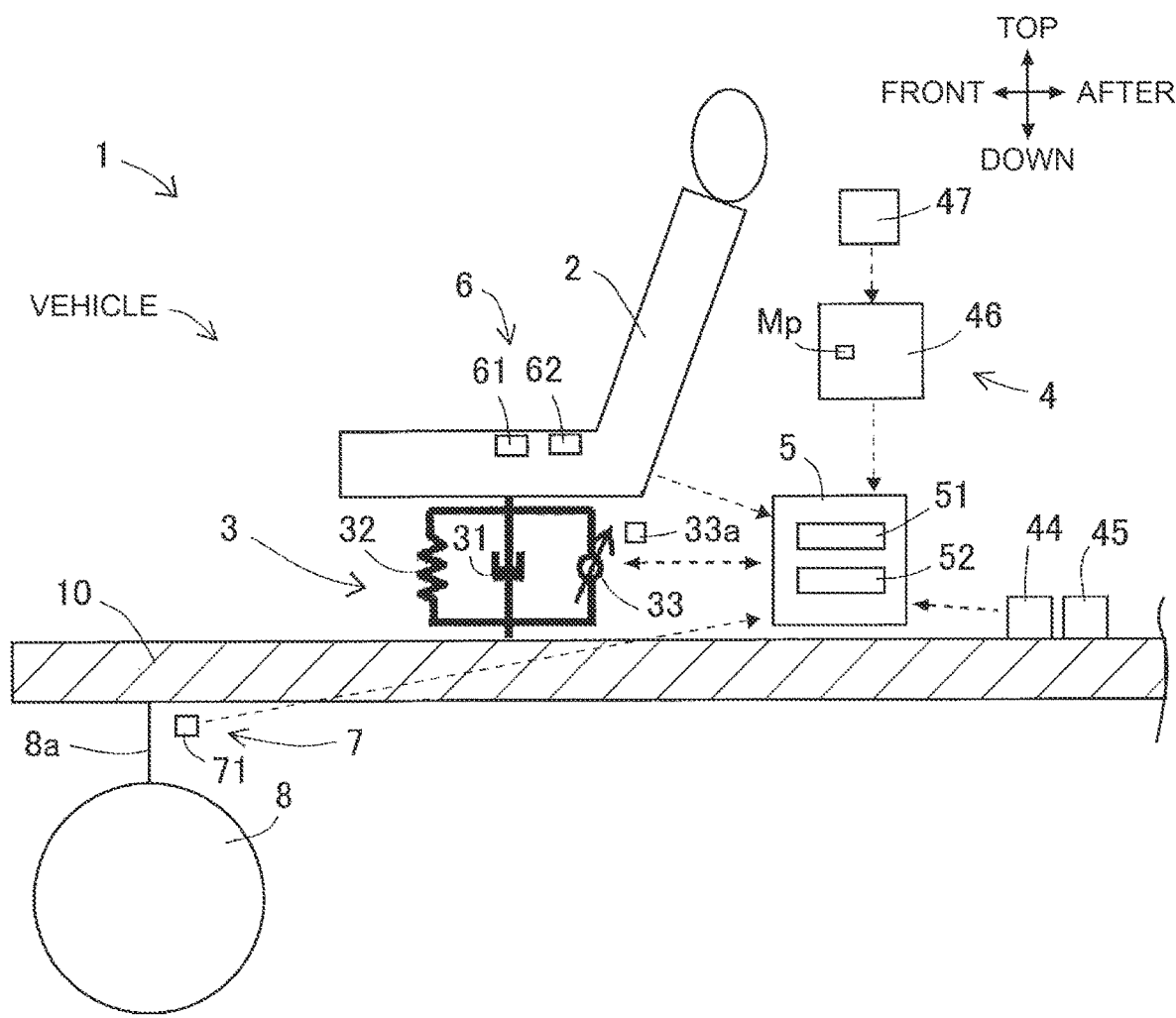
FIG. 3 is a configuration diagram of another embodiment of the present disclosure.

As illustrated in FIG. 3, the state detection device 4 includes an ECU 46 and a receiver 47 of Global Navigation Satellite System (GNSS). ECU 46 memories store road surface information map Mp including map information and road surface information associated with the map information. ECU 46 can detect the unsprung state quantity when the vehicle travels by X meters or after t seconds, based on the traveling direction, the road surface information map Mp, and the position information of the host vehicle. The acceleration applied to the seat 2 based on the unsprung state quantity can be calculated.

As described above, the state detection device 4 may detect information (state information) related to the future acceleration applied to the seat 2. The controller 5 can execute the zero point change processing and the mass calculation processing based on the state information. The controller 5 can calculate the vibration level of the future seat 2 based on the state quantity (state information) of the future seat 2. Since the controller 5 can grasp the control amount in the future in advance by the preview damping control, it is possible to execute the zero point change processing and the mass calculation processing adapted to the road surface information and the presence information in advance. ECU 46 may be the same ECU as the controller 5. In addition, the road surface information may be the detection result of a peripheral monitoring device including a camera and/or a Light Detection and Ranging, or Laser Imaging Detection and Ranging (LiDAR) or the like. That is, the state detection device 4 may include a peripheral monitoring device. The controller 5 may calculate a predicted value (state information) by detecting unevenness or the like of the road surface on the basis of a detection result of the peripheral monitoring device.

The state detection device 4 may include selected devices (all of which may be used) among the acceleration sensors 41 to 45, ECU 46, the receiver 47, and the peripheral monitoring device. In addition, the state detection device 4 may include three or more acceleration sensors provided apart from the vehicle body 10 and configured to detect acceleration in the vertical direction. The controller 5 may calculate the state quantity (acceleration or the like) of the seat 2 based on the detected values of the acceleration sensors.

When the autonomous driving control is executed, the controller 5 can acquire, for example, future turning and acceleration/deceleration data from the autonomous driving ECU in accordance with the target route or the like. The controller 5 can calculate information (state information) on the future acceleration applied to the seat 2 based on the information on the turning and acceleration/deceleration. By using this information, the controller 5 can execute the zero point change processing and the mass calculation processing at an appropriate timing.

Further, the presence detection device 6 may be, for example, an input terminal provided in the vehicle and operable by an occupant for input operation. The input terminal is, for example, a touch panel-type in-vehicle monitor, a tablet, a remote controller with a button switch, or the like. When the occupant selects the position of the seat 2 seated on the input terminal, the selection result is transmitted to the controller 5.

The carrier member may be, for example, a bed or a stretcher frame. In this case, the presence detection device 6 may be, for example, a load sensor provided in a bed or an input terminal as described above. When the carrier member is a stretcher rack, the presence detection device 6 may include, for example, a sensor that detects that the stretcher is fixed.

In the mass calculation processing, it is only necessary to calculate the mass of the occupant or the like on the seat 2, and the configuration or the processing content thereof is not limited to the above. For example, when the sensor is disposed on the seat 2, the controller 5 causes the actuator 33 to apply a predetermined input, such as a step, random, or sinusoidal wave, to the seat 2. The controller 5 performs identification based on the response on the seat 2 to this input, i.e., the detected value of the sensor on the seat 2. This makes it possible to measure the roll moment of inertia and the pitch moment of inertia, which are statically difficult to measure. Even when the vibration processing by the actuator 33 is not performed, the controller 5 may perform the identification by referring to the transfer function on the seat 2 for the input from the vehicle body 10 or simply by referring to the peak frequency of the vibration on the seat 2. In addition, in a case where a sensor capable of measuring a load is disposed on the seat 2, the controller 5 may calculate the mass of the occupant or the like based on the detection value of the sensor.

The traveling detection device 7 may include, for example, a sensor that detects a state (for example, a position) of the shift lever or a sensor that detects a state (on/off) of the side brake in place of or in addition to the wheel speed sensor 71. When the shift lever is in the parking state (position), the controller 5 can determine that the state of the vehicle is in the stop state or that the vehicle speed is equal to or lower than the speed threshold. In addition, when the side brake is on, the controller 5 can determine that the state of the vehicle is a stop state or that the vehicle speed is equal to or lower than the speed threshold. The traveling detection device 7 may be an autonomous driving ECU that recognizes a travel condition during autonomous driving.

The controller 5 may be configured by a plurality of ECU. In addition, the term "ECU" in the present disclosure is synonymous with "computer" and can be replaced with "computer".

What is claimed is:

1. A vehicle control device comprising:
   a carrier member that is installed in a vehicle so as to be movable relative to a vehicle body, on which an occupant or an object to be conveyed is placed;
   an active suspension that is disposed between the carrier member and the vehicle body, and that includes an actuator for changing a relative position of the carrier member in an up-down direction with respect to the vehicle body;
   a state detection device that detects state information that is information regarding current or future acceleration applied to the carrier member;
   a controller that controls the active suspension based on the state information, and supplies a control current to the actuator such that an up-down direction position of the carrier member transitions to a zero point that is set in advance in a case where the up-down direction position of the carrier member is not at the zero point; and
   a traveling detection device that includes a wheel speed sensor that detects a wheel speed of the vehicle and calculates a vehicle speed of the vehicle based on the wheel speed, wherein
   the controller calculates a vibration level of the carrier member based on the state information,
   the controller determines whether (1) the vehicle speed is equal to or lower than a first threshold value, or (2) the vehicle speed is higher than the first threshold value and the vibration level of the carrier member is equal to or lower than a second threshold value, and
   the controller executes zero point changing processing of changing the zero point in a case where the controller determines that (1) the vehicle speed is equal to or lower than the first threshold value, or (2) the vehicle speed is higher than the first threshold value and the vibration level of the carrier member is equal to or lower than the second threshold value.

2. The vehicle control device according to claim 1, wherein the controller, in a state in which supply of the control current to the actuator stopped, sets the up-down direction position of the carrier member after a predetermined amount of time elapses from stopping the supply of the control current, or the up-down direction position of the carrier member in a case where determination is made that the vibration level of the carrier member is no higher than a predetermined permission threshold value, to the zero point, as the zero point changing processing.

3. The vehicle control device according to claim 1, further comprising a presence detection device for detecting presence information that is information regarding presence of the occupant or the object to be conveyed on the carrier member, wherein
   the controller determines whether the occupant or the object to be conveyed is present on the carrier member, based on the presence information, and in a case where the zero point changing processing is to be executed, performs mass calculation processing of calculating a mass of the occupant or the object to be conveyed.

4. The vehicle control device according to claim 3, further comprising a sensor for detecting a state of the actuator, wherein
   the controller executes the mass calculation processing based on a detection value of the sensor.

5. The vehicle control device according to claim 1, wherein the state detection device includes a first acceleration sensor installed in a right front portion of a bottom surface of the carrier member, a second acceleration sensor installed in a left front portion of the bottom surface of the carrier member, and a third acceleration sensor installed in a right rear portion or a left rear portion of the bottom surface of the carrier member.

6. The vehicle control device according to claim 5, wherein the state detection device further includes a fourth acceleration sensor that detects a lateral acceleration and a fifth acceleration sensor that detects a longitudinal acceleration, and
   the controller determines that the vibration level of the carrier member is equal to or lower than the second threshold value and executes the zero point changing processing in a case where the lateral acceleration is equal to or lower than a third threshold value, and the longitudinal acceleration is equal to or lower than a fourth threshold value.

7. The vehicle control device according to claim 1, wherein the state detection device includes a first acceleration sensor that detects a first acceleration of the up-down direction, a second acceleration sensor that detects a second acceleration of a roll direction, and a third acceleration sensor that detects a third acceleration of a pitch direction, and
   the controller determines that the vibration level of the carrier member is equal to or lower than the second threshold value and executes the zero point changing processing in a case where the first acceleration is equal to or lower than a third threshold value, the second acceleration is equal to or lower than a fourth threshold value, and the third acceleration is equal to or lower than a fifth threshold value.

8. The vehicle control device according to claim 7, wherein the state detection device further includes a fourth acceleration sensor that detects a lateral acceleration and a fifth acceleration sensor that detects a longitudinal acceleration, and
   the controller determines that the vibration level of the carrier member is equal to or lower than the second threshold value and executes the zero point changing processing in a case where the first acceleration is equal to or lower than the third threshold value, the second acceleration is equal to or lower than the fourth threshold value, the third acceleration is equal to or lower than the fifth threshold value, the lateral acceleration is equal to or lower than the third threshold value, and the longitudinal acceleration is equal to or lower than a sixth threshold value.

9. The vehicle control device according to claim 1, wherein the state detection device includes
   an electronic control unit that stores road surface information map including map information and road surface information associated with the map information, and
   a receiver that obtains a position of the vehicle from a Global Navigation Satellite System, and
   the electronic control unit detects an unsprung state quantity based on the road surface information map, the road surface information, and the position of the vehicle, and calculates the future acceleration applied to the carrier member based on the unsprung state quantity.

10. The vehicle control device according to claim 1, wherein the controller determines whether the vehicle speed is equal to or lower than the first threshold value.

11. The vehicle control device according to claim 1, wherein the controller determines whether the vehicle speed is higher than the first threshold value and the vibration level of the carrier member is equal to or lower than the second threshold value.

12. The vehicle control device according to claim 1, wherein the carrier member is a seat.

13. The vehicle control device according to claim 1, wherein the carrier member is a bed or a stretcher frame.

* * * * *